(12) United States Patent
Ridings et al.

(10) Patent No.: US 11,422,549 B2
(45) Date of Patent: Aug. 23, 2022

(54) UNMANNED AERIAL SYSTEMS

(71) Applicant: BAE Systems plc, London (GB)

(72) Inventors: Marc Damien Ridings, Preston (GB); Jonathan Gareth Rea, Preston (GB); Matthew Jordan Simpson, Preston (GB); Grant Andrew Chapman, Preston (GB)

(73) Assignee: BAE Systems plc, London (GB)

( * ) Notice: Subject to any disclaimer, the term of this patent is extended or adjusted under 35 U.S.C. 154(b) by 245 days.

(21) Appl. No.: 16/473,653

(22) PCT Filed: Jan. 11, 2018

(86) PCT No.: PCT/GB2018/050067
§ 371 (c)(1),
(2) Date: Jun. 26, 2019

(87) PCT Pub. No.: WO2018/134565
PCT Pub. Date: Jul. 26, 2018

(65) Prior Publication Data
US 2019/0332103 A1 Oct. 31, 2019

(30) Foreign Application Priority Data

Jan. 18, 2017 (GB) ...................... 1700972

(51) Int. Cl.
*G05D 1/00* (2006.01)
*B64C 39/02* (2006.01)
*G05D 1/10* (2006.01)

(52) U.S. Cl.
CPC .......... *G05D 1/0011* (2013.01); *B64C 39/024* (2013.01); *G05D 1/101* (2013.01); *B64C 2201/141* (2013.01)

(58) Field of Classification Search
CPC .... G05D 1/0011; G05D 1/0088; G05D 1/101; B64C 39/024; B64C 2201/00; B64C 2201/141; B64C 2201/126
See application file for complete search history.

(56) References Cited

U.S. PATENT DOCUMENTS 8,078,319 B2* 12/2011 Franke ................. G05D 1/0088
700/248
8,355,834 B2* 1/2013 Duggan ................... G08G 5/04
701/13

(Continued)

FOREIGN PATENT DOCUMENTS

EP 1821246 A2 8/2007
GB 2558919 A1 7/2018

OTHER PUBLICATIONS

International Search Report and Written Opinion of International Application No. PCT/GB2018/050067, dated Apr. 3, 2018, 14 pages.

(Continued)

*Primary Examiner* — Russell Frejd
*Assistant Examiner* — Brandon Z Willis
(74) *Attorney, Agent, or Firm* — Maine Cernota & Rardin

(57) ABSTRACT

Apparatus for configuring a mission automation and decision support system for an unmanned aerial vehicle comprising a user interface and a computer-implemented module configured to:
receive data representative of at least one task to be performed by the UAV, the task being defined by one or more decision points that correspond to system actions or responses that could result from respective specified mission information;
for each decision point(s), request user inputs in response to questions, the questions being designed to determine (Continued)

an extent to which each system action or response can be automated and a respective level of mandated operator approval therefor; and allocate to each decision point a set of one or more corresponding automation levels, each automation level comprising data representative of a measure of automation to be applied at a respective decision point.

20 Claims, 3 Drawing Sheets

(56) References Cited

U.S. PATENT DOCUMENTS

| | | | | |
|---|---|---|---|---|
| 9,215,686 | B2* | 12/2015 | Kazmi | H04B 17/27 |
| 10,410,250 | B2* | 9/2019 | Singhal | B60W 30/0953 |
| 11,237,571 | B2* | 2/2022 | Koda | G05D 1/0274 |
| 2005/0004723 | A1 | 1/2005 | Duggan | |
| 2006/0184292 | A1 | 8/2006 | Appleby | |
| 2009/0234499 | A1* | 9/2009 | Nielsen | B25J 9/161 700/250 |
| 2017/0212525 | A1* | 7/2017 | Wang | G01C 21/3484 |

OTHER PUBLICATIONS

Robert Taylor et al: From safety net to augmented cognition: Using Flexible Autonomy Levels for On-Line Cognitive Assistance and Automation, Feb. 1, 2003 (Feb. 1, 2003), XP055461569, Retrieved Mar. 21, 2018 from the internet: url:https://www.researchgate.net/publication/235087693_From_Safety_Net_to_AugmentedCognition_Using_Flexible_Autonomy_Levels_for_On-Line_Cognitive_Assistance_and_Automation.

Great Britain Search Report of Great Britain Application No. 1700972.1, dated Aug. 2, 2017, 1 page.

* cited by examiner

UNMANNED AERIAL SYSTEMS

RELATED APPLICATIONS

This application is a national phase application filed under 35 USC § 371 of PCT Application No. PCT/GB2018/050067 with an International filing date of Jan. 11, 2018, which claims priority of GB Patent Application 1700972.1 filed Jan. 18, 2017. Each of these applications is herein incorporated by reference in its entirety for all purposes.

FIELD OF THE INVENTION

This invention relates generally to unmanned aerial systems and, more particularly, in at least one aspect, to a method of configuring a mission support system for an unmanned aerial vehicle.

BACKGROUND OF THE INVENTION

Unmanned aerial vehicles (UAVs) are quickly becoming ubiquitous in military command and control operations. With reduced radar signatures, increased endurance, and the removal of humans from immediate threat, unmanned aerial vehicles are in extensive use around the world, particularly (but not exclusively) in military applications. Despite the absence of a crew onboard such UAVs, human operators are still required for supervisory control, and current UAVs require human guidance to varying degrees, often through several operators, which is what essentially defines an unmanned aerial system (UAS).

Unmanned aerial systems now exist in which there is some degree of automation of the UAV, and human operators are less in direct manual control of systems, but more involved in the higher levels of planning, decision-making and remote operations. In all cases, a mission involving a UAV will require actions that must be executed, whether human or computer-driven, and decisions that must be taken, based on up-to-date mission information, to meet overall mission requirements. Thus, current UAS architectures include communications technologies to link an operator to an airborne mission system, so as to give them access to the information required to support so-called operator Situational Awareness (SA). However, such communications technologies, which include an RF element, are limited in both reliability/availability and bandwidth compared to interfaces used on manned platforms to perform equivalent functions. This, coupled with the fact that the operator is physically separated from the aircraft, introduces various limitations on the appropriate level of operator control as well as significant barriers to operator Situational Awareness. Following a period of reduced or lost communications, the operator's SA will be out of date, incorrect or misaligned to the system knowledge base, and the operator will require the system to provide a summarised view of the situation(s), and the system must, therefore, be able to capture such information requirements. In the meantime, of course, and in the absence of adequate communications, the UAV is unable to receive command and control (C2) signals from the operator, and if a critical decision point occurs during that time, adequate (and safe) control of the UAV may be severely adversely affected.

There is, therefore, an ongoing desire to increase automation in unmanned aerial systems, and thereby increase the number of tasks that can be automated if necessary (e.g. in the event of reduced or lost communications, whether planned or unplanned) without compromising the success of the mission or, indeed, the safety of the UAV. In fact, there are a number of key drivers for the introduction of more automation in unmanned aerial systems, including:

increased mission effectiveness in the absence of robust communications and/or reduced dependency on communications;

the ability to operate to a restrictive Emission Control (EMCON) policy with a reduced communications bandwidth;

to support safe operation in the absence of robust communications;

to provide an increased flexibility when balancing workload;

to provide more options for reducing the number of operators required;

to allow operators to focus on higher level mission goals;

potential reductions in training and operating costs.

In general, and in order for a UAS to achieve any required safety certification, be considered operationally viable and be endorsed by the customer community, many "decision points" within a set of tasks defining a mission can simply be set at a "failsafe" level of automation, in the event that no operator input is available, wherein the UAV reverts, in each case, to a specified "safest" option available at a particular decision point. However, this is clearly not ideal, since that option, whilst deemed "safest", may not necessarily contribute positively to the overall mission and, indeed, may have a negative impact.

It would, therefore, be desirable to provide a generic, repeatable design framework within a process for configuring a mission automation and decision support system for an unmanned air system that is certifiable and operationally viable, and that serves to address at least some of the issues described above.

SUMMARY OF THE INVENTION

Thus, in accordance with a first aspect of the present invention, there is provided apparatus for configuring a mission automation and decision support system for an unmanned aerial vehicle, the apparatus comprising a user interface and a computer-implemented module configured to:

receive data representative of at least one task to be performed by said unmanned aerial vehicle in use during a mission, said task being defined by one or more decision points, each corresponding to one or more system actions or responses that could result from respective specified mission information;

for the or each of a plurality of decision point(s), request, via said user interface, respective user inputs in response to specified questions, said specified questions being designed to determine at least an extent to which each relevant system action or response can be automated and a respective level of mandated operator approval therefor; and allocate to the or each decision point, using said respective user inputs, a set of one or more corresponding automation levels, each automation level comprising data representative of a measure of automation to be applied at a respective decision point.

Advantageously, in allocating said automation levels, said computer-implemented module may be configured to select the or each automation level in a set from a plurality of predefined automation levels. In this case, the plurality of predefined automation levels may comprise at least five or even eight automation levels, each predefined automation level defining a predetermined measure of automation.

In an exemplary embodiment, the plurality of predefined automation levels are graduated from a maximum level specifying full system autonomy to a minimum level specifying no or minimal system autonomy.

The computer-implemented module may be configured to utilise said user inputs for a decision point in a predefined process flow that outputs an automation level, or data representative thereof, depending on the responses, in the form of respective user inputs, provided to said specified questions. Advantageously, said process flow may define an algorithm configured to apply a predefined ruleset for each of a plurality of automation levels to said respective user inputs, thereby to output an appropriate automation level. Thus a predefined set of rules is provided for each automation level supported by the system, and the computer-implemented module uses the user inputs and these sets of rules to determine an appropriate automation level.

In an exemplary embodiment, the computer-implemented module may be configured to, for a single decision point, allocate two or more automation levels, each being conditional on specified mission data.

Advantageously, the specified questions may be additionally designed to determine, based on user inputs thereto, if operator approval for a system action or response at a decision point, if not mandated, is desirable and/or possible.

Optionally, the computer-implemented module may be configured to allocate to the or each decision point, using a respective distinct set of user inputs, a first set of one or more automation levels corresponding to an automated mode of operation of said unmanned aerial vehicle and a second set of one or more automation levels corresponding to a manual mode of operation of said unmanned aerial vehicle.

Indeed, the computer-implemented module may be configured to allocate to the or each decision point, using a respective distinct set of user inputs, a plurality of sets of one or more automation levels, each set of automation levels corresponding to a respective one of a plurality of modes of operation of said unmanned aerial vehicle. Each mode of operation may have associated therewith a respective set of specified questions and corresponding process flow.

In accordance with another aspect of the present invention, there is provided a computer-implemented method for use in configuring a mission automation and support system for an unmanned aerial vehicle, the method comprising:

obtaining, via a user interface, data representative of at least one task to be performed by said unmanned aerial vehicle in use during a mission, said task being defined by one or more decision points, each corresponding to one or more system actions or responses that could result from respective mission information;

requesting and obtaining, via said user interface, respective user inputs in response to specified questions, said specified questions being designed to determine at least an extent to which each relevant system action or response can be automated and a respective level of mandated operator approval therefor; and using a computer-implemented module, preconfigured to perform a process flow using said respective user inputs, to allocate to the or each decision point a set of corresponding automation levels, each automation level comprising data representative of a measure of automation to be applied at a respective decision point.

In accordance with another aspect of the present invention, there is provided a method of manufacturing a mission automation and decision support system for an unmanned aerial vehicle, comprising:

allocating, in respect of at least one operating mode of said unmanned aerial vehicle, a set of one or more automation levels to the or each decision point defining each of one or more tasks to be performed by said unmanned aerial vehicle in use during a mission, according to the method substantially as described above;

in respect of each decision point having allocated thereto a set of two or more automation levels in respect of the same operating mode, either selecting one of said automation levels or applying conditional data to each of two or more of said automation levels;

providing a computer-implemented support module configured to be communicably coupled to systems of said unmanned aerial vehicle for performing action(s) and response(s) in respect thereof and to receive mission information, in use, in respect of said mission;

configuring said support module to, in response to receipt of specified mission information associated with a decision point, select a respective action or response in accordance with the automation level allocated to said decision point, generate control data, and output said control data to one or more systems of said unmanned air vehicle, said control data being configured to cause said selected action or response to be performed.

An aspect of the present invention extends to a mission automation and decision support system for an unmanned aerial vehicle manufactured according to a method substantially as described above.

In accordance with yet another aspect of the present invention, there is provided a computer program product comprising computer readable medium, having thereon computer program code means, when the program code is loaded, to make the computer execute a method, for use in the method substantially as described above for configuring a mission automation and support system, the method comprising:

obtaining, via a user interface, data representative of at least one task to be performed by said unmanned aerial vehicle in use during a mission, said task being defined by one or more decision points, each corresponding to one or more system actions or responses that could result from respective mission information;

requesting and obtaining, via said user interface, respective user inputs in response to specified questions, said specified questions being designed to determine at least an extent to which each relevant system action or response can be automated and a respective level of mandated operator approval therefor; and performing a process flow using said respective user inputs, to allocate to the or each decision point a set of corresponding automation levels, each automation level comprising data representative of a measure of automation to be applied at a respective decision point.

BRIEF DESCRIPTION OF THE DRAWINGS

These and other aspects of the present invention will be apparent from the following specific description, in which embodiments of the present invention are described in more detail, by way of examples only, and with reference to the accompanying drawings, in which.

DETAILED DESCRIPTION

Thus, aspects of the present invention seek to address an objective technical problem of providing a repeatable, consistent and reliable method/process for designing and manufacturing a certifiable mission automation and decision support system for a UAS, by the provision of a process that includes the step of allocating defined levels of automation at decision points within various tasks and configuring the system to automate UAV activity at those decision points whilst adhering to those allocated automation levels, in the event, for example, that command and control (i.e. operator input) is lost. The defined levels of automation assigned at any decision point dictates the method (and degree) of mandatory operator interaction required with the system at the decision point. As a result of the associated configuration, the system is provided with the ability to select an appropriate set of behaviours to be followed at a given decision point in the absence of a command and control (C2) link. The defined automation levels can be determined in a prescribed manner, as will be explained in detail hereinafter (by way of example only), but are based (at least) on whether or not automation of an action is, in fact, technically possible and also whether or not operator approval of an action is mandated (by statute or certification requirements, for example).

In accordance with exemplary embodiments of the invention, where an automated capability is deemed appropriate in respect of an action, manual control or influence may also be included, either switched or in parallel, if appropriate. When switching between any form of automated and manual control, it will be appreciated that the behaviour of the system during transition should advantageously be specified.

Manual actions or activities can be included where quantifiable benefits can be realised or where automation is not feasible, is limited or can benefit from operator involvement (as specified by the automation level allocated to the decision point/action). The benefits of operator control or influence may include:
- a greater ability to respond to unforeseen circumstances and a rapidly changing environment;
- the ability to apply judgment and interpretation for non-deterministic rules (such as Rules of Engagement) or scenarios;
- to (potentially) reduce the development cost of some aspects of the system (for example, where automation is technically possible but the associated technology is prohibitively expensive);
- improved operator engagement/situational awareness;
- to provide mitigation for some failure conditions.

In general, operator control and influence can be exploited at various levels throughout the system, from low level control of specific activities to high level control of system goals, in accordance with the respective automation levels allocated to those activities and/or associated decision points.

Figure 1:
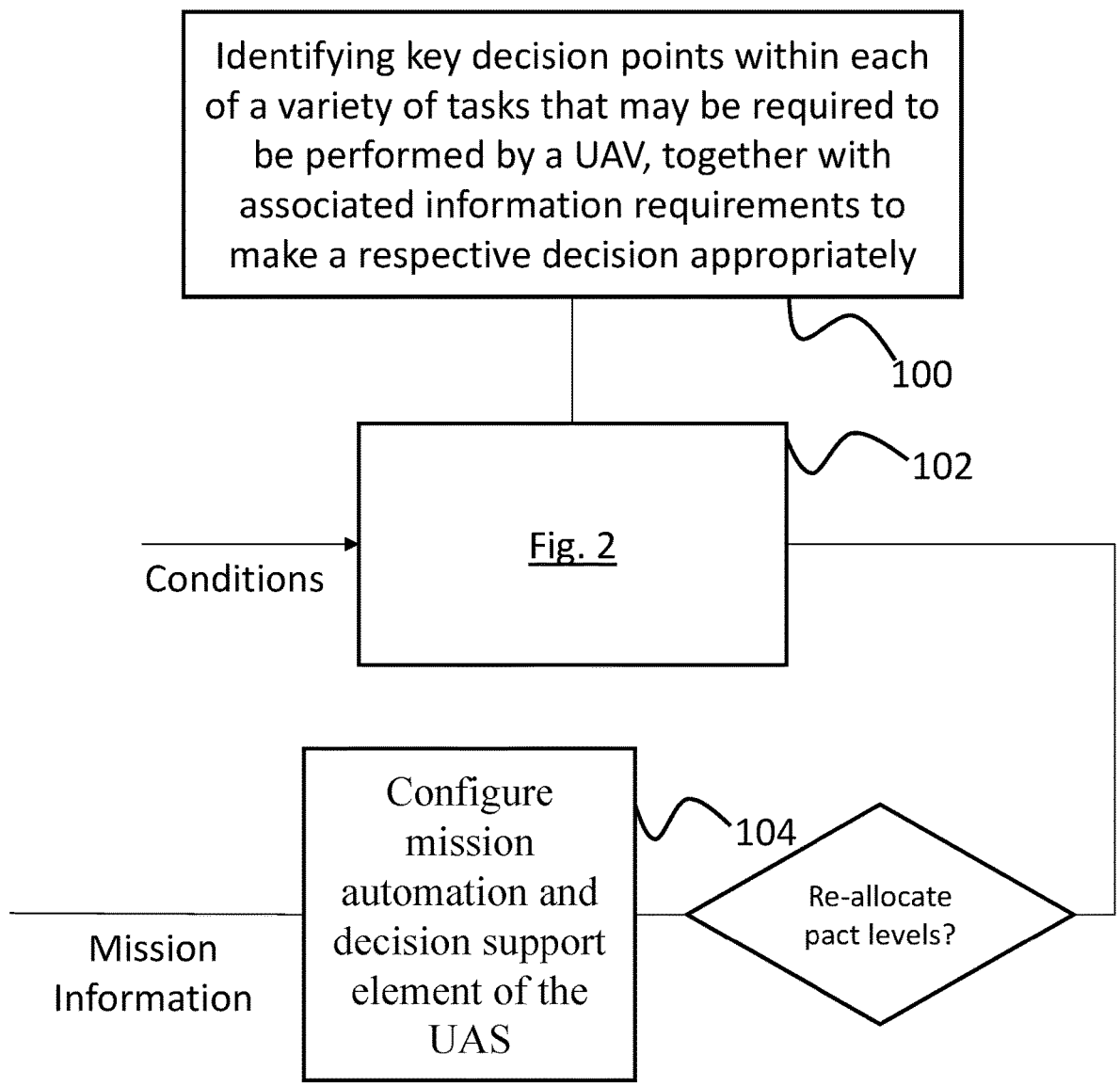
FIG. 1 is a schematic flow chart illustrating steps of a method according to an exemplary embodiment of the present invention.

Referring to FIG. 1 of the drawings, a first step 100 in a method according to an exemplary embodiment of the present invention comprises identifying key decision points within each of a variety of tasks that may be required to be performed by a UAV, together with associated information requirements to make a respective decision appropriately, and perform a so-called automation analysis (step 102). To ensure an optimal balance of automation across the system, a goal and task centred approach to this analysis is proposed, in accordance with an exemplary embodiment of the invention, wherein the aim is not to optimise the system solely around the needs of the operator or allow the system to exploit all available automation technologies, but to determine what levels of automation are most appropriate for successfully achieving the mission objectives in the operational environment, balancing the needs and constraints of the system and the operator.

A number of models and frameworks can be considered to provide suitable methods of quantifying and measuring the level of automation to be used by a mission automation and decision support system of the type referred to herein. However, a PACT (Pilot Authority & Control of Tasks) model has been advantageously selected for the present exemplary embodiment as a valid automation framework wherein the levels are largely defined in relation to the level of operator-system interaction.

The PACT levels are defined in Table 1 below:

TABLE 1

| PACT Locus of Authority | Computer Autonomy | PACT Level | Levels of HMI (Human-Machine Interaction) |
| --- | --- | --- | --- |
| Computer monitored by pilot | Full | 5b | Computer does everything autonomously |
| | | 5a | Computer chooses action, performs it and informs human |
| Computer backed up by pilot | Action unless revoked | 4b | Computer chooses action and performs it unless the human disapproves |
| | | 4a | Computer chooses action and performs it if the human approves |
| Pilot backed up by computer | Advice and, if authorised, action | 3 | Computer suggests options and proposes one of them |
| Pilot assisted by computer | Advice | 2 | Computer suggests options to human |
| Pilot assisted by computer only when requested | Advice only if requested | 1 | Human asks computer to suggest options and human selects |
| Pilot | None | 0 | Whole task done by human except for the actual operation |

Thus, the above-described model/framework provides a mechanism by which to represent the distribution of decision making and decision support responsibility between the operators and the mission system. The level of decision support provided by the system evolves from simply providing information, to options and recommendations to the operator. From PACT 4b upward, the system has the authority to make decisions in the absence of any instruction from the operator. As a result of the authority granted to the system, each PACT level has characteristics associated with it that influence how it may be used appropriately. The following guidelines may be used as an exemplary rule set when applying the PACT framework to the present invention. Table 2 below provides general PACT guidelines.

TABLE 2

PACT Guidelines

| | |
|---|---|
| 2.3.1 | PACT0-4a requires operator input for a decision to be made and as such cannot be utilised under lost link conditions. |
| 2.3.2 | PACT 0-4a decisions must not be the sole option for any decisions where lack of operator input could result in a hazard (to ensure a lost link event does not result in a loss of aircraft or other hazardous states). Operator may be used as one layer of hazard mitigation but must be coupled with others. |
| 2.3.3 | PACT levels 1-3 require the system to have sufficient data to suggest options. If this data is not available to the system, if these PACT levels are not appropriate. |
| 2.3.4 | PACT levels 1-3 are mutually exclusive and cannot be active at the same time against the same decision points. |
| 2.3.5 | PACT levels 4a to 5b are mutually exclusive and cannot be active at the same time against the same decision point unless that decision point can be split based on a defined set of conditions, e.g. minor faults during taxi may trigger a 4b decision to stop after a period of time unless told otherwise; major faults may trigger a 5a decision to stop immediately. The definition of minor and major faults in this example must be fully defined and understood by the operators. |
| 2.3.6 | Multiple PACT levels may be active against a single decision point in parallel, e.g. the decision to perform a missed approach may be triggered by an operator at PACT0 or by the system at PACT5a, although 0 and 0 must be considered. |
| 2.3.7 | A single decision point may have a single PACT option active but the operator may have the ability to switch operating mode, e.g. switching between manual (PACT0) and automatic (PACT5a) control of sensor zoom level. |
| 2.3.8 | Operators may revoke higher automation levels against specific decision points where analysis has determined it acceptable/safe to do so. For example, it may be necessary to revoke the system's ability to perform an aborted take-off under certain circumstances or switch off collision avoidance functionality during taxi as a result of high levels of false triggers. |
| 2.3.9 | Specific PACT levels may only be appropriate under specific circumstances or with specific technology available. These conditions should be recorded and the PACT allocation recorded as conditional to allow this to be explored further. |
| 2.3.10 | Where the process for making a decision cannot be quantified in a deterministic manner by the system or constrained within a defined set of variables, the use of PACT4b-5b should be avoided. This may be applicable to safety/legal requirements that the system is not capable of meeting without operator support. |
| Pact 0 Guidelines | |
| 2.3.11 | PACT 0 is appropriate where the system is not capable of or is not permitted to perform a function, make a decision or provide options for operator selection. |
| 2.3.12 | PACT 0 is appropriate where manual decisions are being continuously made and require constant inputs into the system, e.g. steering commands during manual taxi. |
| 2.3.13 | PACT 0 is appropriate where there are no discrete options available or the number of options cannot be easily prioritised and displayed to the operator, e.g. entry of an altitude value into an auto-pilot console. |
| 2.3.14 | PACT 0 is appropriate when the system does not have sufficient information to generate possible options. |
| PACT 1 Guidelines | |
| 2.3.15 | PACT 1 is appropriate when the operator wishes to assess decision options but the system has sufficient information to generate those options but insufficient information to make a recommendation. |
| 2.3.16 | PACT 1 is appropriate when system has insufficient information to understand when it is appropriate to present solution options for selection. |
| 2.3.17 | PACT 1 is appropriate when there may be a need to control/prioritise the availability of decision support information being presented to the operator at any time. |

TABLE 2-continued

PACT Guidelines

PACT 2 Guidelines

| | |
|---|---|
| 2.3.18 | PACT 2 is appropriate when the system has sufficient information to generate options but insufficient information to make a recommendation. |
| 2.3.19 | To utilise PACT 2, the mission system must have the ability to understand when options may be required by an operator for assessment and selection. |
| 2.3.20 | PACT 2 is appropriate when a timely operator response is not critical. |
| 2.3.21 | PACT 2 should only be used where the options can be presented without saturating the operator with too much information. This may be largely controlled by HMI implementation, however, the nature of the decisions being considered may present an early indication of this problem. |
| 2.3.22 | PACT 2 is appropriate when the information available to the system may not be complete and the operator needs to evaluate multiple options before making a decision. |

PACT 3 Guidelines

| | |
|---|---|
| 2.3.23 | PACT 3 is appropriate when the system has sufficient information to generate options and make a recommendation. |
| 2.3.24 | To utilise PACT 3, the mission system must have the ability to understand when options and a recommendation may be required by an operator for assessment and selection. |
| 2.3.25 | PACT 3 is appropriate when the information available to the system may not be complete and the operator needs to evaluate multiple options before making a decision. |
| 2.3.26 | PACT 3 is appropriate where a timely operator response is not critical. |
| 2.2.27 | PACT 3 should only be used where the options can be presented without saturating the operator with too much information. This may be largely controlled by the HMI implementation, however, the nature of the decisions being considered may present an early indication of the problem. |

PACT 4a&4b Guidelines

| | |
|---|---|
| 2.3.28 | A PACT 4a decision in isolation shall present a single proposal for the operator to accept or reject. The enactment of the proposal is only initiated upon receipt of an operator input but the system determines the need for a decision to be made. |
| 2.3.29 | A PACT 4a decision is not appropriate for any decisions where lack of timely approval will create a hazardous state. |
| 2.3.30 | A PACT 4a decision is appropriate for triggered events where the system needs to be in the appropriate state, or requires a specific set of data before conducting an action. Where the system is capable of completing the action regardless of state or available information, PACT 0 may be more appropriate. |
| 2.3.31 | PACT 4b is appropriate for decisions where lack of timely approval will create a hazardous state. The operator must have sufficient time available to assess the proposal but the enactment point may not be purely driven by time, it may be a function of position, range to an object, etc. |
| 2.3.32 | PACT 4b is appropriate for decisions where the operator may wish to override the system choice but failure to provide operator approval may result in a hazard. The primary reason for being unable to provide operator approval is a lost link event. |
| 2.3.33 | PACT 4a can be used in isolation (i.e. without any other PACT levels operating) where a decision is a binary choice, i.e. to do something or not. In the absence of operator approval, the system will not enact change, i.e. will do nothing/continue as planned. Example: the system determines that it has sufficient information and is in the correct state to commence auto-taxi so requests approval to move off (PACT 4a). Accepting the proposal will commence taxi, rejecting or waiting to provide approval will result in the aircraft remaining in its current state, i.e. stationary. No further solutions need to be presented to the operator at this stage. |
| 2.3.34 | PACT 4b can be used in isolation (i.e. without any other PACT levels operating) where a decision is a binary choice; i.e. to do something or not. In the absence of operator approval, the system will enact the change it believes is necessary. |

TABLE 2-continued

PACT Guidelines

| | |
|---|---|
| 2.3.35 | For non-binary choices, where multiple options are available, rejecting the proposed solution may leave a level of ambiguity or put the vehicle at risk so PACT4a/PACT4b decisions should be coupled with at least one of the lower PACT level (0-3) to resolve disagreements between system and operator, e.g: <br> accept proposal (PACT4a/4b) <br> reject proposal and continue with current plan (PACT4a/4b) <br> request alternative options to select from (PACT 1) <br> alternative options are displayed along with the original proposal (PACT3) <br> Enter alternative solution manually (PACT 0) <br> Example: The system detects a Missile Engagement ZONE (MEZ) threat on its route and proposes an alternative route within its given constraints to avoid the threat. The implications of continuing on the existing route are such that this decision is made at PACT4b allowing the operator a period of time to select an alternative course of action. There are several options available should the proposed route not be acceptable to the operator: continue on existing route, select an alternative system generated route (based on different priorities) or manually edit a route. In this case, the system has the authority to make a decision in the absence of the operator to maintain safe operation, but the operator has the ability to select from a series of alternative routes (PACT 3) or manually generate a route (PACT 0). |
| PACT 5a&5b Guidelines | |
| 2.3.36 | PACT 5a & 5b are appropriate for decisions where the system has sufficient information and authority to act without operator intervention. |
| 2.3.37 | When using PACT 5a & 5b, the system must be fully capable of carrying out a task without operator input. |
| 2.3.38 | Operators cannot stop PACT5a & 5b decisions being made without revoking authority. |
| 2.3.39 | Operators must only be allowed to revoke system authority where it is safe to do so. |
| 2.3.40 | If the operator revokes authority from the system, a resolution strategy must be available to ensure the decisions can still be made and the mission can continue. |
| 2.3.41 | Operators may influence PACT 5a decisions by manipulating input data, e.g. by changing system priorities/constraints or modifying the system knowledge base. |
| 2.3.42 | PACT 5b shall only be assigned to an activity if is appropriate to routinely operate the system without feeding back data to the operator: Activities being carried out by the system that would, under normal operating conditions, feedback to the operator should be captured as either PACT 4a/5a, whether communications are available or not. If a restrictive EMCON policy is being considered, it is acceptable to identify PACT 5b as appropriate, although it is recommended to identify this as a conditional assignment. |

An initial stage of the automation analysis identifies the key decision points and the associated information requirements to allow the automation analysis to be performed. A flow chart, illustrating a process for allocating PACT level(s) to each key decision point identified, is shown in FIG. 2 of the drawings in the form of a series of questions.

Figure 2:
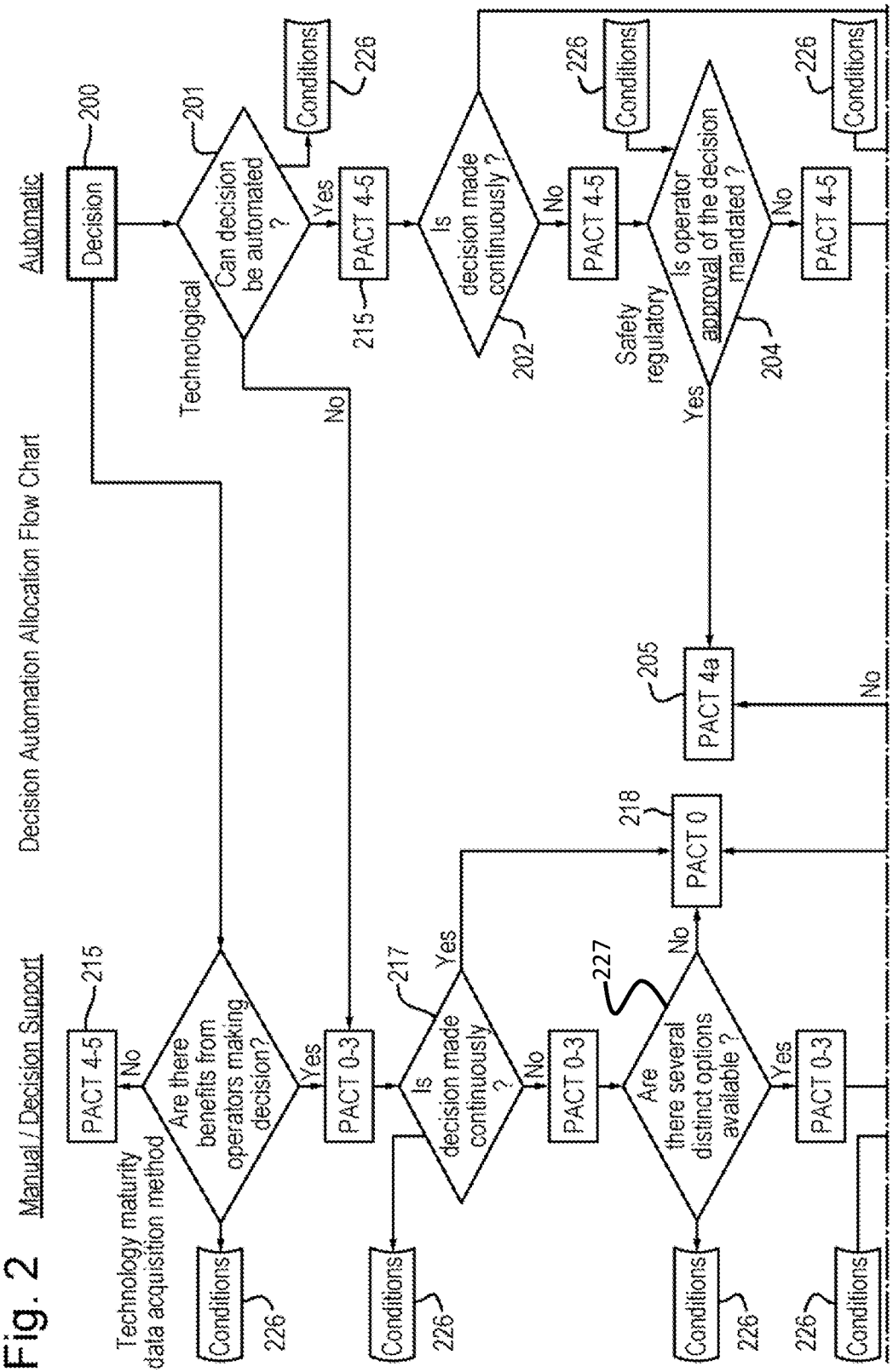
FIG. 2 is a schematic flow chart illustrating a method of determining automation data for use in a method according to an exemplary embodiment of the present invention.
Figure 2:
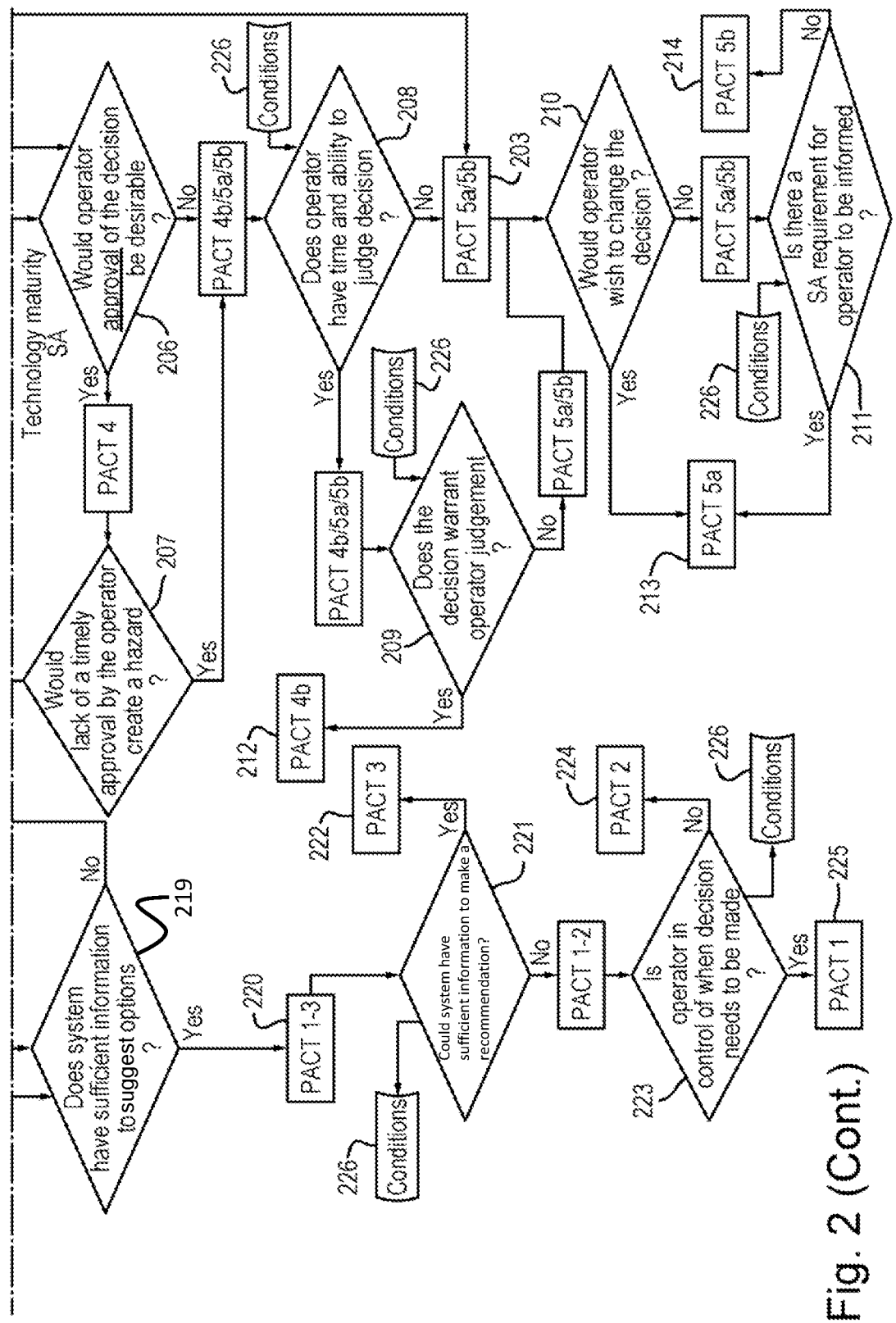

Referring, then, to FIG. 2, the starting point is the Decision Box 200. Two lines of enquiry are applied: automatic and manual/decision support. It is considered advantageous, at least for some applications, that the first pass be done to assess automatic options, as the general objective is to try and include as much automation as possible. However, the present invention is not necessarily intended to be limited in this regard, and it is important, in many cases, to understand how manual options can be implemented/supported.

Referring first to the automatic "leg" of the flow chart illustrated in FIG. 2, from the Decision box 200, the first question (201) is: Can decision be automated? If not, data representative of that condition is output and the automatic leg of the process ends. If 'yes', the PACT allocation will be 4-5 and the next question (202) is: Is decision made continuously? If yes, the process skips to box 203, indicating a PACT allocation of 5a or 5b. If the answer is no, the next question (204) is: Is operator approval of the decision mandated? If yes, PACT 4a is allocated at 205. If no, the next question (206) is: Would operator approval of the decision be desirable? If yes, the next question (207) is: Would lack of timely approval by the operator create a hazard? If no, PACT 4a is allocated at 205. If yes, or if the answer to question 206 is no, the next question (208) is: Does operator have time and ability to judge decision? If no, the process skips to box 203. If yes, the next question (209) is: Does the decision warrant operator judgement? If yes, PACT 4b is allocated to the decision at box 212, whereas if the answer is no, the process skips to box 203.

From box 203, the next question (210) is: Would operator wish to change the decision? If yes, PACT 5a is allocated to the decision at box 213, whereas, if no, the final question (211) is: Is there a SA requirement for operator to be informed? If yes, PACT 5a is allocated (at box 213) and if no, PACT 5b is allocated to the decision at box 214.

Referring now to the manual/decision support "leg" of the process illustrated in FIG. 2 of the drawings, the first question (216) is: "Are there benefits from operators making decision?" If not, the process skips to box 215 (indicating that the PACT level allocated will be 4-5) and the manual "leg" of the process effectively ends. If yes, and the decision can be automated, a PACT level 0-3 can additionally (or alternatively) be allocated to the decision, and the next question (217) is: "Is decision made continuously?" If yes, PACT 0 is allocated to the decision at box 218. If the answer is no, the next question (227) is: "Are there several distinct options available?" If the answer is no, PACT 0 is allocated (box 218). If yes, a PACT level 0-3 can additionally (or alternatively) be allocated to the decision, and the next question (219) is: Does system have sufficient information to suggest options? If no, PACT 0 is allocated (box 218). If yes, a sub-process to determine if PACT levels 1, 2 or 3 can/should be allocated starts at box 220, and starts with the question (221): Could system have sufficient information to make a recommendation? If yes, PACT 3 is allocated to the decision at box 222. If no, the next question (223) is: Is operator in control of when decision needs to be made? If no, PACT 2 is allocated (box 224) and, if yes, PACT 1 is allocated to the decision at box 225.

It is expected that the answers to the questions may be dependent on a number of conditions. Such conditions could be technological conditions, such as an emerging technology being sufficiently matured to the point where it can be certified for use. Alternatively, there may be operational conditions that change the answers to the questions, such as the need to operate covertly. If this is the case, the conditions (depicted by boxes 226 in FIG. 2) should be identified and the remaining questions progressed for both outcomes, as will be explained in more detail by way of examples hereinafter. This may require the described process to be exercised multiple times for the same decision and, of course, multiple PACT levels can be allocated to the same decision, dependent on conditions as well as, for example, the operating mode of the platform.

Two examples are provided below to demonstrate how the above-described process can be used to arrive at multiple PACT allocations for the same decision. The first example has no conditions identified, the second has two.

EXAMPLE 1

Capability: Taxi Air Vehicle
Decision: Does an emergency stop need to be requested to avoid a collision?
Timescale: Immediate (<2 seconds reaction time)

| Question | Answer |
|---|---|
| Automation Leg | |
| Can decision be automated? | Yes |
| Is the decision made continuously? | No (only when object is detected) |
| Is operator approval of the decision mandated? | No |
| Would operator approval of the decision be desirable? | No |
| Does operator have time and ability to judge decision? | No |
| Would operator wish to change the decision? | Yes (potentially revoking an auto stop capability) |
| Result: PACT 5a | |
| Manual Leg | |
| Are there benefits from operators making decisions? | Yes - if system cannot detect all obstructions |
| Is decision made continuously? | No |
| Are there several distinct options available? | No |
| Result: PACT 0 | |

EXAMPLE 2

Capability: Recover air vehicle
Decision: What type of approach is required?
Timescale: minutes

| Question | Answer |
|---|---|
| Automation Leg | |
| Can decision be automated? | Yes |
| Is the decision made continuously? | No |
| Is operator approval of the decision mandated? | No |
| Would operator approval of the decision be desirable? | Yes |
| Would lack of timely approval by the operator create a hazard? | Yes (No when under restrictive EMCON) |
| Does operator have time and ability to judge decision? | Yes |
| Does the decision warrant operator judgement? | Yes |
| Result: PACT 4b | |
| Restrictive EMCON condition | |
| Would lack of timely approval by the operator create a hazard? | No |
| Would operator wish to change the decision? | No |
| Is there a SA requirement for the operator to be informed? | No |
| Result: Conditional PACT 5b | |
| Manual Leg | |
| Are there benefits from operators making decisions? | Yes |
| Is decision made continuously? | No |
| Are there several distinct options available? | Yes |
| Does system have sufficient information to suggest options? | Yes (Not if operating from unplanned airfields) |
| Could system have sufficient information to make a recommendation? | Yes |
| Result: PACT3 | |
| Operating from unplanned airfields condition | |
| Does system have sufficient information to suggest options? | No |
| Result: PACT 0 | |

Thus, by utilising the process illustrated in FIG. 2 of the drawings, and following the guidelines detailed above, a number of appropriate PACT levels can be identified for each decision. In some cases, it may be appropriate to have multiple PACT levels active against the same decision, as will be described in more detail hereinafter with reference to "combination strategies". In other cases, it is impossible to have multiple PACT levels active against the same decision points at the same time, for example, generation of flight control demands. The required level of automation and operator interaction may also vary from one scenario to the next, which drives the need for flexible automation that can be adjusted while the system is in operation. Individual exploiting platforms may be expected to perform their roles in different environments which also drives a need for a range of automation options.

Whilst flexible automation provides significant benefits, it will be understood by a person skilled in the art that such flexibility needs to be controlled to ensure that operators fully understand what the split of roles and responsibilities is at any given time between operator and system. In order to achieve this, an exemplary embodiment of the present invention incorporates a baseline set of system operating modes that addresses changes in automation level in relatively large steps, each assigning similar activities and decision points to the operator or system as appropriate.

A simple example of this is the approach to generating flight control demands. There are several distinct levels of automation that could be applied:
  Manual Flight Control (Attitude or rate and throttle demands from operator)
  Flight Director (System provides cues to the operator)
  Auto-Pilot (Heading, speed or altitude demands from the operator)
  Fully automatic (Route generation and waypoint following)

Minor adjustments might then be permitted away from the baseline concepts, if deemed appropriate to the application. As an example, the manual flight control option may permit an automatic speed control option but not an automatic attitude control without switching to the auto-pilot automation concept.

A number of variables need to be considered when developing the levels of automation provided within a system, such as:
  Number and type of decisions being made;
  Expected level of operator training and skill areas;
  Operational context in which the system is expected to utilise different levels of automation;
  Maturity of automation technology;
  Legal requirements;
  Safety requirements;
  Exploiting platform type/requirements.

General guidelines for applying individual PACT levels have been provided above and, in many cases, it may be appropriate to have only one PACT level associated with a decision point. However, the initial automation analysis process may identify multiple applicable PACT levels and, when developing automation concepts from these PACT levels, it may be appropriate to retain multiple PACT levels within one concept. Thus, a number of PACT combination strategies are proposed below, by way of examples only, to illustrate a manner in which multiple PACT levels can be applied to the same decision point within a single automation concept, thereby allowing the responsibility for a decision to be shared between the system and the operator in an appropriate manner. These exemplary combination strategies are referred to hereinafter as: System and Operator in Parallel—No Assistance; System Decisions with Operator Guidance—Discrete Options Only; and System Decisions with Operator Guidance and Modification.

1. System and Operator in Parallel—No Assistance

This type of combination strategy may allow either the system or the operator to trigger an action at any time, which may be appropriate for decisions where the system and/or operator are not capable of processing all available data, thus requiring a split in responsibility.

TABLE 3

System and Operator in Parallel

| PACT Combination | Description |
| --- | --- |
| 0 & 4a | Binary decisions, i.e. to trigger an action or not, where the system or the operator may observe the necessary conditions to trigger the associated action but operator approval is required. |
| 0 & 4b | Binary decisions where the system or the operator may observe the necessary conditions to trigger an associated action. Where the system is initiating the action, the operator has a defined period of time to reject the system's decision. |
| 0 & 5a | Binary decisions requiring immediate action where the system or operator may observe the necessary conditions to trigger the associated action. The operator would not have time to make a judgement and override the system. If the operator does not wish the system to continue to have this authority, it must be revoked either after the event or prior to the operation. |

2. System Decisions with Operator Guidance—Discrete Options Only

This type of combination strategy may be appropriate for decisions where there are a number of discrete options available, the system has sufficient information to be able to select the most appropriate solution and there is sufficient time and value in providing operator oversight.

TABLE 4

System Decisions with Operator Guidance

| PACT Combination | Description |
| --- | --- |
| 4a & 1 | Decisions with discrete options available where the system requests approval before committing to an action. The operator may request alternative options if necessary. |
| 4a & 3 | Decisions with discrete options available where the system requests approval but automatically displays the alternative options to the operator to select from if necessary. |
| 4b & 1 | Decisions with discrete options available where the system has selected its intended course of action and allows the operator a period of time to request alternative options to be displayed for review and to make an alternative selection if necessary. |
| 4b & 3 | Decisions with discrete options available where the system has selected its intended course of action but automatically displays alternative options and allows the operator a period of time to review and make an alternative selection if necessary. |

3. System Decisions with Operator Guidance and Modification

This type of combination strategy may be appropriate if the discrete options provided by the system can be further modified, and results in the combination strategy described immediately above, augmented with a PACT 0 to allow the operator to make the necessary changes, by either editing the proposed solution or entering a full solution. Updating the systems knowledge base could allow alternative options to be presented.

TABLE 5

System Decisions with Operator Guidance & Modification

| PACT Combination | Description |
| --- | --- |
| 4a & 1 & 0 | As for Table 4, but operator has the |
| 4a & 3 & 0 | ability to further modify the options |
| 4b & 1 & 0 | presented. |
| 4b & 3 & 0 | |

Note: these combination strategies do not combine PACT levels 1-3 as they are mutually exclusive and should not run in parallel. This is also true for PACT levels 4a-5b. It may be appropriate to switch between these PACT levels but this would represent a change in mode of operation, rather than running the PACT levels in parallel.

Variable automation may be deemed to be appropriate in circumstances such as:

Loss/degradation of communications;
Degradation of system
Mission context
Tactical/Operating Environment
Available Data Sources
Available skill-sets
Operator Workload When transferring authority from operator to system, or vice versa, the data requirements and data availability may not be the same, and this is considered and incorporated in the automation analysis proposed herein.

Referring back to FIG. 1 of the drawings, once the automation analysis has been performed, at step 102, in respect of each decision point of all tasks to be performed by the UAS, the mission automation and decision support element of the UAS can be configured appropriately at step 104, and in accordance with the automation levels allocated at each decision point. Once the automation levels have been appropriately allocated and assigned (at least initially), their true meaning in the context of the task and the wider application will be understood by a person skilled in the art, and, if necessary, an automation level can be selected from a number returned by the automation analysis for a particular decision point, so as to align the respective automation level with other, related tasks and decision points and take into account combined automation levels where appropriate. A process model describing a process flow for each task, including conditions and required mission information (inputs) can then be generated. Any suitable configuration/coding method can subsequently be utilised to configure one or more computer-implemented modules to perform the desired process flow. The resultant mission automation and decision support element may further incorporate a module configured to enable a user to dynamically re-allocate one or more automation levels at a decision point, in response to environmental/tactical changes, for example (which may be identifiable from mission information received or input(s) from the operator). Such automation level re-allocation may, in some exemplary embodiments, be performed 'manually' by means of input/instruction from an authorised operator.

It will be appreciated by a person skilled in the art, from the foregoing description, that modifications and variations can be made to the described embodiments, without departing from the scope of the invention as claimed.

The invention claimed is:

1. An apparatus for configuring a mission automation and decision support system for an unmanned aerial vehicle, the apparatus comprising a user interface and a computer-implemented module configured to:

receive data representative of at least two tasks to be performed by said unmanned aerial vehicle in use during a mission, each of said tasks being defined by one or more decision points, each corresponding to one or more system actions or responses that could result from respective specified mission information;

for the or each of a plurality of decision point(s), request, via said user interface, respective user inputs in response to specified questions, said specified questions being designed to determine at least an extent to which each relevant system action or response can be automated and a respective level of mandated operator approval therefor;

allocate to the or each decision point, using said respective user inputs, a set of one or more corresponding automation levels, each automation level comprising data representative of a measure of automation to be applied at a respective decision point; and upload to the mission automation and decision support system data regarding the automation levels allocated to the or each decision point, wherein the computer-implemented module is configured to upload to the mission automation and decision support system data regarding the automation levels allocated to the or each decision point in advance of the mission, wherein the mission automation and decision support system for the unmanned aerial vehicle is in operable communication with and capable of controlling the unmanned aerial vehicle, wherein, in accordance with the one or more corresponding automation levels allocated to the or each decision point, the mission automation and decision support system for the unmanned aerial vehicle is configured to provide varying measures of automation to assist a user in controlling the unmanned aerial vehicle, wherein, the mission automation and decision support system is configured to control the unmanned aerial vehicle in the absence of operable communications between the unmanned aerial vehicle and the user, wherein at least one of the at least two tasks is unrelated to navigation, and and wherein the mission comprises the completion of all of the at least two tasks.

2. The apparatus according to claim 1, wherein, in allocating said automation levels, said computer-implemented module is configured to select the or each automation level in a set from a plurality of predefined automation levels.

3. The apparatus according to claim 2, wherein said plurality of predefined automation levels comprises at least five automation levels, each predefined automation level defining a predetermined measure of automation.

4. The apparatus according to claim 2, wherein said plurality of predefined automation levels are graduated from a maximum level specifying full system autonomy to a minimum level specifying no or minimal system autonomy.

5. The apparatus according to claim 1, wherein said computer-implemented module is configured to utilise said user inputs for a decision point in a predefined process flow that outputs an automation level, or data representative thereof, depending on the responses, in the form of respective user inputs, provided to said specified questions.

6. The apparatus according to claim 5, wherein said process flow defines an algorithm configured to apply a predefined ruleset for each of a plurality of automation levels to said respective user inputs, thereby to output an appropriate automation level.

7. The apparatus according to claim 1, wherein the computer-implemented module is configured to, for a single decision point, allocate two or more automation levels, each being conditional on specified mission data.

8. The apparatus according to claim 1, wherein said specified questions are additionally designed to determine, based on user inputs thereto, if operator approval for a system action or response at a decision point, if not mandated, is desirable and/or possible.

9. The apparatus according to claim 1, wherein said computer-implemented module is configured to allocate to the or each decision point, using a respective distinct set of user inputs, a first set of one or more automation levels corresponding to an automated mode of operation of said unmanned aerial vehicle and a second set of one or more automation levels corresponding to a manual mode of operation of said unmanned aerial vehicle.

10. The apparatus according to claim 9, wherein each mode of operation has associated therewith a respective set of specified questions and corresponding process flow.

11. The apparatus according to claim 1, wherein said computer-implemented module is configured to allocate to the or each decision point, using a respective distinct set of user inputs, a plurality of sets of one or more automation levels, each set of automation levels corresponding to a respective one of a plurality of modes of operation of said unmanned aerial vehicle.

12. The apparatus for configuring a mission automation and decision support system for an unmanned aerial vehicle of claim 1 further comprising receiving data representative of relevant laws or regulations in place in areas the UAV is anticipated to be travelling through during a mission that could impact the operation of the UAV, wherein allocating to the or each decision point a set of one or more corresponding automation levels takes into account the data representative of relevant laws or regulations in place in areas the UAV is anticipated to be travelling through during the mission, preventing automation levels that would run afoul of the relevant laws and regulations from being implemented.

13. The apparatus for configuring a mission automation and decision support system for an unmanned aerial vehicle of claim 1 wherein the mission automation and decision support system is located onboard the UAV.

14. The apparatus for configuring a mission automation and decision support system for an unmanned aerial vehicle of claim 1 further comprising receiving data representative of an emissions control policy and configuring the UAV to operate with a reduced communications bandwidth in areas requiring restrictive emission controls.

15. A computer-implemented method for use in configuring a mission automation and support system for an unmanned aerial vehicle, the method comprising:
obtaining, via a user interface, data representative of at least two tasks to be performed by said unmanned aerial vehicle in use during a mission, each of said tasks being defined by one or more decision points, each corresponding to one or more system actions or responses that could result from respective mission information;
requesting and obtaining, via said user interface, respective user inputs in response to specified questions, said specified questions being designed to determine at least an extent to which each relevant system action or response can be automated and a respective level of mandated operator approval therefor;
using a computer-implemented module, preconfigured to perform a process flow using said respective user inputs, allocating to the or each decision point a set of corresponding automation levels, each automation level comprising data representative of a measure of automation to be applied at a respective decision point; and
upload to the mission automation and decision support system data regarding the automation levels allocated to the or each decision point,
wherein uploading to the mission automation and decision support system data regarding the automation levels allocated to the or each decision point is done in advance of the mission,
wherein the mission automation and decision support system for the unmanned aerial vehicle is in operable communication with and capable of controlling the unmanned aerial vehicle,
wherein, in accordance with the one or more corresponding automation levels allocated to the or each decision point, the mission automation and decision support system for the unmanned aerial vehicle is configured to provide varying measures of automation to assist a user in controlling the unmanned aerial vehicle,
wherein, the mission automation and decision support system is configured to control the unmanned aerial vehicle in the absence of operable communications between the unmanned aerial vehicle and the user,
wherein at least one of the at least two tasks is unrelated to navigation, and
and wherein the mission comprises the completion of all of the at least two tasks.

16. A method of manufacturing a mission automation and decision support system for an unmanned aerial vehicle, the method comprising:
allocating, in respect of at least one operating mode of said unmanned aerial vehicle, a set of one or more automation levels to the or each decision point defining each of one or more tasks to be performed by said unmanned aerial vehicle in use during a mission, according to the method of claim 15;
in respect of each decision point having allocated thereto a set of two or more automation levels in respect of the same operating mode, either selecting one of said automation levels or applying conditional data to each of two or more of said automation levels;
providing a computer-implemented support module configured to be communicably coupled to systems of said unmanned aerial vehicle for performing action(s) and response(s) in respect thereof and to receive mission information, in use, in respect of said mission; and
configuring said support module to, in response to receipt of specified mission information associated with a decision point, select a respective action or response in accordance with the automation level allocated to said decision point, generate control data, and output said control data to one or more systems of said unmanned air vehicle, said control data being configured to cause said selected action or response to be performed.

17. A mission automation and decision support system for an unmanned aerial vehicle manufactured according to the method of claim 16.

18. A computer program product comprising a non-transitory, computer readable medium, having thereon instructions configured to make a computer execute a method, for use in the method of claim 15, comprising:
- obtaining, via a user interface, data representative of at least one task to be performed by said unmanned aerial vehicle in use during a mission, said task being defined by one or more decision points, each corresponding to one or more system actions or responses that could result from respective mission information;
- requesting and obtaining, via said user interface, respective user inputs in response to specified questions, said specified questions being designed to determine at least an extent to which each relevant system action or response can be automated and a respective level of mandated operator approval therefor; and
- performing a process flow using said respective user inputs, to allocate to the or each decision point a set of corresponding automation levels, each automation level comprising data representative of a measure of automation to be applied at a respective decision point.

19. The computer-implemented method for use in configuring a mission automation and support system for an unmanned aerial vehicle of claim 15 further comprising receiving data representative of relevant laws or regulations in place in areas the UAV is anticipated to be travelling through during a mission that could impact the operation of the UAV, wherein allocating to the or each decision point a set of one or more corresponding automation levels takes into account the data representative of relevant laws or regulations in place in areas the UAV is anticipated to be travelling through during the mission, preventing automation levels that would run afoul of the relevant laws and regulations from being implemented.

20. The computer-implemented method for use in configuring a mission automation and support system for an unmanned aerial vehicle of claim 15 wherein the mission automation and decision support system is located onboard the UAV.

* * * * *